(No Model.)

W. P. MORGAN.
SPADING HARROW.

No. 551,395. Patented Dec. 17, 1895.

WITNESSES:
H. C. H. Cooper.
C. G. Crammell

INVENTOR:
William P. Morgan,
By Geo. B. Selden,
Atty.

UNITED STATES PATENT OFFICE.

WILLIAM P. MORGAN, OF BROCKPORT, NEW YORK, ASSIGNOR TO D. S. MORGAN & CO., OF SAME PLACE.

SPADING-HARROW.

SPECIFICATION forming part of Letters Patent No. 551,395, dated December 17, 1895.

Application filed August 17, 1894. Serial No. 520,589. (No model.)

*To all whom it may concern:*

Be it known that I, WILLIAM P. MORGAN, a citizen of the United States, residing at Brockport, in the county of Monroe and State of New York, have invented certain Improvements in Spading-Harrows, of which the following is a specification, reference being had to the accompanying drawings.

My invention relates to certain improvements in the construction of the revolving spring-cutters of spading-harrows, which improvements are fully described and illustrated in the following specification and the accompanying drawings, the novel features thereof being specified in the claims annexed to the said specification.

Figure 1:
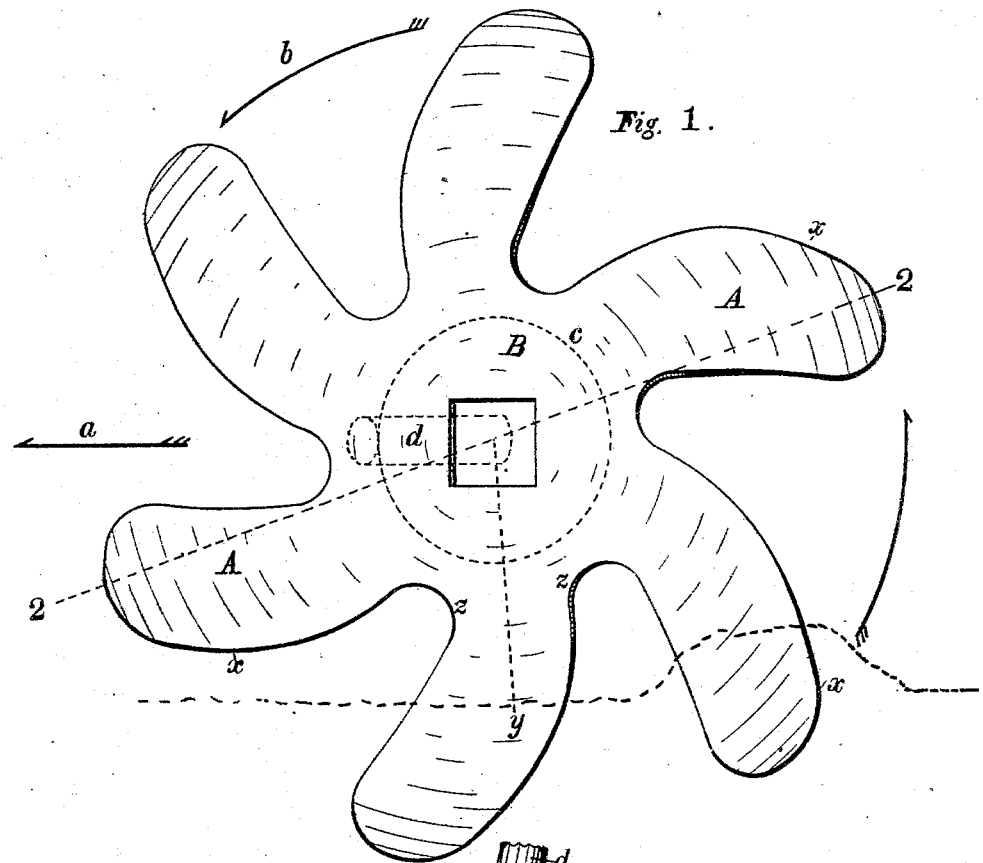
Figure 2:
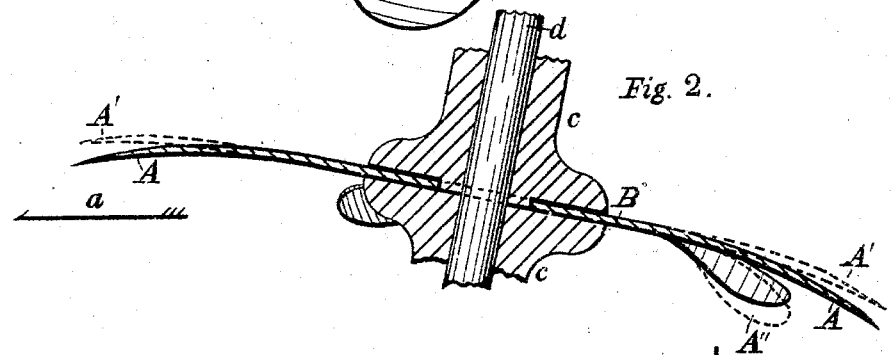

In the accompanying drawings, representing my invention, Figure 1 is a side view of a revolving harrow-cutter embodying my invention. Fig. 2 is a section on the line 2 2, Fig. 1.

In the practice of my invention I form a series of concave S-shaped spring-teeth A integral with a central perforated disk B, thus producing a revolving harrow-cutter adapted for use either singly or in gangs supported on an axis arranged at an angle with the line of draft. The S-shaped spring-teeth extend radially outward from the central disk, as shown, preferably in oppositely-arranged pairs, and are concaved or bent laterally, so that they will act on the soil in the proper manner. The convex edges $x$ of the S-shaped teeth are sharpened or brought to a cutting-edge in any suitable manner. The teeth are formed from a circular disk, of suitable dimensions and material, in any suitable manner, as by the use of punches or dies, the forward edges of the teeth being sharpened by grinding or otherwise. The best results are attained in the operation of the revolving cutter on the earth when the teeth are given different concavities—that is, when the concavity of any one tooth is made greater or less than the concavities of the next adjacent teeth. Such an arrangement is represented by the dotted lines in Fig. 2, in which the teeth are given different concavities. The teeth are bent laterally to different degrees, as shown at A′ A′ A″, the opposite teeth being bent to a degree different from their neighbors. The points of the teeth then act on the earth at places out of line with each other, and their operation is more uniformly distributed. In practice I find it most convenient to make the concavity of the pairs of teeth opposite each other equal and greater or less than that of the next adjacent pairs, as shown. In this way the operation is made to exactly resemble the action of the now well-known spading-harrow.

The manner of the operation of my improved revolving harrow-cutter will be understood from Fig. 1, in which the concave side of the S-shaped spring-teeth, in consequence of their inclination relative to the line of draft, as they rise from the position in which they penetrate the soil to the greatest depth, elevate that portion of the earth immediately in front of them, and turn it over and disintegrate it as it falls away from the teeth, producing a true spading action and leaving the soil uniformly mellowed and adapted to the usual subsequent agricultural operations. The direction of the draft is indicated by the arrow $a$, and the rotation of the harrow-cutter by the arrow $b$. The supporting-shaft $d$ being arranged at an angle with the line of draft and being drawn forward continuously, the teeth as they are caused to revolve by the draft cut into the earth until they become vertical, and then, in rising upward and backward from such position, elevate and reverse those portions of the earth opposed to them, the elasticity of the teeth as they recoil from the pressure of the soil against them serving to assist the spading operation and to free the teeth from any adhering dirt. Each tooth in its turn yields laterally as it encounters the resistance of the soil, and as such resistance decreases as the tooth rises out of the soil the resilience of the tooth discharges the earth lifted by it and prevents any accumulation thereon. The S shape of the teeth, with the deepest cutting-point in front of the line $y$ of the center of the teeth, not only increases the elasticity of the teeth but permits the free escape of weeds or rubbish over the curved portion of the blade.

In my improved construction, with the S-shaped spring-teeth formed integral with the central disk, the teeth are preferably widened toward the disk, as represented at $z$, either rounded or otherwise, whereby their strength and resiliency are increased. I am however aware that toothed harrow-disks have been made entire and no claim is made to such device but only to such disks having wide intervals, as specified, with continuous curved boundaries. It is preferred to round the teeth at their outer ends to give a cutting-edge most suitable for cutting the soil and also weeds or roots and also best adapted to slide over stones and objects that cannot be cut, and it is also preferred to round the connection of the teeth at their junction with the body of the disk, as represented, and to make the interval between the teeth at and near said junction as wide or nearly as wide as a tooth. This curved form at the base of the teeth, co-operating with the wide interval between the teeth, facilitates the clearance of grass and weeds which clog cutters that have at this point an angular or narrow space whether the disk and teeth be made entire or not. Clogging by weeds would however be aggravated by joints between separate parts and teeth integral with the disk are therefore preferred, though this feature by itself is not new.

My improved revolving harrow-cutter is mounted in any suitable or preferred way on a supporting-shaft, arranged at an angle with the line of draft, and attached to a suitable draft-frame. The cutter may revolve with the shaft, or it may rotate thereon. In the construction shown the cutter revolves with the shaft, being attached thereto by suitable collars or spools $c$, having squared shoulders fitting a corresponding opening in the central disk, and a series of my improved cutters being applied to the shaft so as to farm a gang and secured thereon by a nut or other suitable device at one end. In practice, two such gangs will be arranged on opposite sides of the line of draft, and inclined in opposite directions, so that the lateral thrust of one gang is opposed by that of the other. For a partially-inoperative position, in which the harrow may be used with little effect, or drawn over country roads, the axes of the gangs are brought into a position at right angles with the line of draft.

The integral disk with the concave S-shaped spring-teeth projecting radially outward therefrom possesses the advantages that it is cheaply made, its production with the requisite number of teeth, of which I prefer at least six, requiring the handling of but a single piece, the collars or spools which connect it with the shaft are simplified in construction, and the spring-teeth, being widened toward the spools, may be strengthened where strength is most requisite, near the support, and in practical operation my improved harrow-cutter with spring-teeth is found to be entirely satisfactory from all points of view, both of the user and manufacturer. The cutter is made from material having the requisite resilience, and the teeth may be thinned from the spool outward if preferred. The teeth may be brought to the requisite edge by the use of dies or formers, thus obviating grinding. My improved harrow-cutter is mounted either singly or in gangs of any preferred number in any suitable form of draft-frame, whereby it or a gang are caused to travel over the soil while arranged at an angle with the line of draft.

I claim—

1. The herein-described revolving harrow-cutter, consisting of a series of concaved S-shaped spring teeth arranged radially around a common center, and formed integrally with a central perforated disk,—each tooth having a concavity different from the next adjacent teeth, substantially as described.

2. The herein-described revolving harrow-cutter, consisting of a series of S-shaped spring teeth, having different concavities, arranged radially around a common center and formed integrally with a central perforated disk, substantially as described.

3. The herein-described revolving harrow-cutter, consisting of a series of concave S-shaped spring-teeth arranged radially in opposite pairs having different concavities about a common center, and formed integrally with a central perforated disk, substantially as described.

WILLIAM P. MORGAN.

Witnesses:
GEO. B. SELDEN,
C. G. CRANNELL.